United States Patent
Sugimoto et al.

(10) Patent No.: US 8,665,382 B1
(45) Date of Patent: Mar. 4, 2014

(54) PIVOTING DISPLAY DEVICE USED IN AIRCRAFT

(75) Inventors: Yukio Sugimoto, Redmond, WA (US); Hironori Katoh, Redmond, WA (US); Koji Nakamura, Redmond, WA (US)

(73) Assignee: Aircraft Cabin Systems, Redmond, WA (US)

( * ) Notice: Subject to any disclaimer, the term of this patent is extended or adjusted under 35 U.S.C. 154(b) by 37 days.

(21) Appl. No.: 13/585,631

(22) Filed: Aug. 14, 2012

(51) Int. Cl.
*H04N 5/64* (2006.01)
*A47B 5/00* (2006.01)

(52) U.S. Cl.
USPC ............ 348/837; 312/7.2; 312/248; 312/325; 348/836; 248/323; 248/917

(58) Field of Classification Search
USPC ............... 248/371, 323, 324, 917, 919–923; 312/319.7, 7.2, 246, 248, 325; 345/204, 905; 348/825, 836, 837, 838; 349/58; 361/679, 679.21, 681, 682; 244/118.5
See application file for complete search history.

(56) References Cited

U.S. PATENT DOCUMENTS

| | | | | |
|---|---|---|---|---|
| 5,096,271 A * | 3/1992 | Portman | | 312/7.2 |
| 5,467,106 A * | 11/1995 | Salomon | | 345/87 |
| 5,583,735 A * | 12/1996 | Pease et al. | | 361/679.21 |
| 6,256,078 B1 * | 7/2001 | Ogata | | 349/58 |
| 6,416,027 B1 * | 7/2002 | Hart | | 248/324 |
| 6,424,386 B1 * | 7/2002 | Shimizu | | 348/837 |
| 6,476,879 B1 * | 11/2002 | Ho et al. | | 348/837 |
| 7,055,790 B2 * | 6/2006 | Schroeter | | 248/323 |

\* cited by examiner

*Primary Examiner* — Tan Le
(74) *Attorney, Agent, or Firm* — Ladas & Parry LLP

(57) ABSTRACT

A pivoting device especially useful in aircraft passenger cabins that can pivot a monitor between stowed and open positions, the pivoting device including a forward/reverse rotatable driving motor. An electromagnetic brake holds the monitor in stowed and opened positions A power unit powers the motor and the electromagnetic brake. A controller controls the pivoting movement of the monitor. The power unit includes a rectifier circuit that transforms AC to a DC, a step-up circuit that steps up the transformed voltage, a voltage regulator that adjusts the transformed voltage to a prescribed DC voltage, and a retraction power retention circuit including a capacitor. When no source voltage is detected while the monitor is in its opened state, the capacitor supplies the power to a voltage regulator of the power circuit, deactivates the electromagnetic brake and reverse rotates the motor to drive the monitor to its stowed position.

9 Claims, 8 Drawing Sheets

PIVOTING DISPLAY DEVICE USED IN AIRCRAFT

BACKGROUND OF THE INVENTION

1. Field of the Invention

The present invention relates to the improvement of a pivoting display device that comprise a video monitor that is used over the head of a passengers especially in aircraft and that can pivot the monitor open from its stowage position to its display position.

2. Description of the Background Art

Many passenger aircraft are provided with video monitors for every 2-3 rows of passenger seats to show and play movies, information about the flight and other similar material to passengers. These monitors are usually fixed to Passenger Service Unit (PSU) rails attached under the overhead baggage rack/compartment above the passenger seat. Said monitors are attached so that they can be swung open downwards to the display position and can be stowed back after their use. These devices are also provided with an electric motor and a drive mechanism that conveys the motor's rotating force. It is desirable that this pivoting display device can retract its monitor into the stowage position in case the power supply to the cabin fails for some reason.

The Federal Aviation Administration (FAA) requires that all monitors to be stowed into their stowing location to secure the safety of passengers in case the power supply to the cabin fails.

Several prior art pivoting display devices have been disclosed, for example, in U.S. Pat. No. 5,096,271 (Portman, Mar. 17, 1992) and U.S. Pat. No. 5,467,106 (Salomon, Nov. 14, 1995), display devices are configured to retract the monitor to the stowage position using a spring mechanism in case the power supply fails. For those using the spring mechanism, the spring usually contracts when the monitor is driven to the display position thus the energy accumulated in the spring is used as a driving force to stow the monitor. The driving mechanism that conveys the rotating force of the motor and that consists of a gear transmission mechanism or a link mechanism etc. is arranged between the motor and the monitor and conveys the swinging force to pivot the monitor.

Other pivoting display devices are, as disclosed for instance in U.S. Pat. No. 6,373,216 (Ho, Apr. 16, 2002), configured to use the forward and reverse rotation of the motor to open and close the monitor instead of using a spring mechanism when stowing the monitor. This device uses capacitors as a power unit to reverse rotate the motor in the direction of stowing the monitor. That is, it charges the capacitor while the power is supplied and the monitor is in its opened state and then drives the monitor in the direction of stowing it by changing over the circuit with a relay and by reverse rotating the motor using the power charged in the capacitor.

Systems wherein stowage of the monitor in case of a power failure is by using a spring mechanism need to accumulate a decompression force in the spring when driving the monitor to its open position. The motor used for this therefore carries a heavy load, thus necessitating the use of a motor with a capacity enough to carry this load. Their operational reliability when driven by the motor is also prone to problems. The spring mechanism provides a force urging stowing the monitor while the monitor is in its opened state since it needs to rotate and stow the monitor by itself in case of a power failure. When this occurs, the motor and gear box have to disconnect from the spring mechanism which may require a clutch, thereby further complicating the mechanism. The monitor needs to be braked or locked by an urging force larger than the urging force of the spring mechanism in the direction of stowing the monitor so as to maintain its opened state against the force urging stowage. Furthermore, a mechanical type device using the spring mechanism to stow the monitor, especially the spring mechanism carrying said constant load is prone to deterioration by a secular change which results in problems in maintaining its reliability.

SUMMARY OF THE INVENTION

The aim of the present invention is to meet the requirement of the Federal Aviation Administration (FAA) and to provide a pivoting display device for aircraft that is capable of securely driving the monitor to the stowage position in case of a power failure. Further aims of embodiments of the invention are to effect such stowage without causing an aging as in mechanical type devices and to improve the reliability of its operation by reducing the load carried by the motor that drives the monitor open and close, and at the same time be capable of efficiently charging and discharging capacitors that are used as a power unit to supply the power in case of a power failure. Use of the pivoting display device of the present invention is not, however, confined to use in aircraft and may find use in other environments, especially other means of passenger transport including railroad cars and buses or coaches equipped with monitors.

To provide a solution for the above FAA requirement, the present invention provides an embodiment comprising a mechanism configured so that a monitor capable of having a stowed state and also an open state and which is movable between the stowed state and the open state by being swung by a pivoting device of the monitor that comprises a forward/reverse rotatable driving motor and a transmission mechanism that conveys the motor's output. It is also provided with an electromagnetic brake that is activated at each position in the stowed state and the opened state of the monitor and that maintain these states, a power unit that supplies the power to the motor and the electromagnetic brake, and a controller that controls the pivoting movement of the monitor. The said power unit is a power circuit that outputs the prescribed DC voltage, comprising a rectifier circuit that transforms an input AC voltage to a DC voltage, a step-up circuit that steps up the transformed DC voltage and a voltage regulator that adjusts the transformed voltage to provide the prescribed DC voltage. The said power unit is further provided with a retraction power retention circuit that stores the said stepped up DC voltage in the capacitor while the source voltage is supplied and that supplies the power stored in the capacitor to the voltage regulator of the said power supply circuit when there is no source voltage available. The said controller, when it detects no source voltage while the monitor is in its opened state, deactivates the electromagnetic brake and reverse rotate the motor to drive the monitor to its stowed state using the power stored in the retraction power retention circuit.

In the present invention, the controller, when it detects the opened state of the monitor, is capable of deactivating the electromagnetic brake and reverse rotating the motor thereby driving the monitor from its opened state to its stowed state even when no power is supplied since it supplies the power stored in the retraction power retention circuit while the power is failing regardless of its control state. The load that drags against driving the monitor to its stowed state is light because the reverse rotation of the motor under the power failing condition deactivates the electromagnetic brake that has been activated in the opened state and the operation involves simply the transmission mechanism. The voltage of the power supply used to charge capacitors in the retraction power retention circuit is stepped up when supplied and is capable of charging the capacitor efficiently. It is also capable of efficiently outputting a high power that is stored in the capacitor because the output voltage is adjusted down to the required low voltage via the voltage regulator when capacitors are discharged. This also ensures its reliability by supporting the secure stowing operation of the monitor in case of a power failure.

Accordingly, the present invention provides a pivoting display device for use in moving a monitor such as those used in aircraft between stowed and open positions which device comprises:

a monitor configured to pivot around a shaft supported by bearings fixed to a frame of the stowing location;

a monitor pivoting device including a forward/reverse rotatable motor that can drive the said monitor in a first closing direction and in a second opening direction, and a transmission mechanism that conveys a rotating force of the motor to the monitor;

an electromagnetic brake that is configured to be activated at each position in the stowed state and the opened state of the monitor to maintain these states but deactivated when the monitor is in the process of being moved between its open and stowed positions;

a power unit that drives the said monitor and also drives the said motor and the said electromagnetic brake;

a controller that controls the pivoting of the said monitor about said shaft;

the said power unit being a power circuit that outputs the prescribed DC voltage, comprising a rectifier circuit that transforms an input AC voltage to a DC voltage, a step-up circuit that steps up the transformed DC voltage, and a voltage regulator that adjusts the stepped up DC voltage;

wherein said power unit is further provided with a retraction power retention circuit that stores the said stepped up DC current in the capacitor while the source voltage is supplied and that supplies the power stored in capacitors to the voltage regulator of the said power circuit when there is no source voltage available;

and wherein the said controller, when under a power failure condition where no source voltage is detected and detecting that the monitor is in its opened state, deactivates the electromagnetic brake and reverse rotating the motor to drive the monitor to its stowed state using the power stored in the retraction power retention circuit.

In a preferred embodiment, the controller is configured to determine whether power has failed and to run an interrupt processing when it detects that no source voltage has been available for a prescribed amount of time, and to deactivate the electromagnetic brake to cause the motor to drive the monitor to its stowed state using the power stored in the retraction power retention circuit if it detects that the monitor is in its opened state;

and said controller is further configured such that in a temporary power failure when source voltage is restored before the said prescribed time elapses, the said controller determines that no power failure has occurred and by supplying the power stored in the retraction power retention circuit of the said power unit, maintains its control according to its normal processing procedure it followed before the momentary power failure occurred without carrying out the interrupt processing.

In one particular embodiment, the power unit is provided with a rectifier that transforms the input AC voltage into the DC voltage, a switching circuit that transforms this DC voltage into a high frequency pulse train and a current distortion correction circuit that corrects the distortion of the current;

wherein said rectifier transforms the input AC voltage into a DC voltage that is further transformed into a high frequency pulse train and then stepping up this DC voltage into a high voltage using it to charge capacitors of the retraction power retention circuit; and is further capable of adjusting the said stepped up high DC voltage or the voltage discharged from the capacitor using a voltage regulator to attain a required and prescribed DC voltage and also capable of outputting the said required and prescribed DC voltage after correcting it as current distortion caused by the fluctuation of the input voltage using the current distortion correction circuit.

DESCRIPTION OF THE PREFERRED EMBODIMENTS

Preferred embodiments of the present invention, that is, a pivoting display device for use in aircraft will be described with reference to the drawings.

Figure 5:
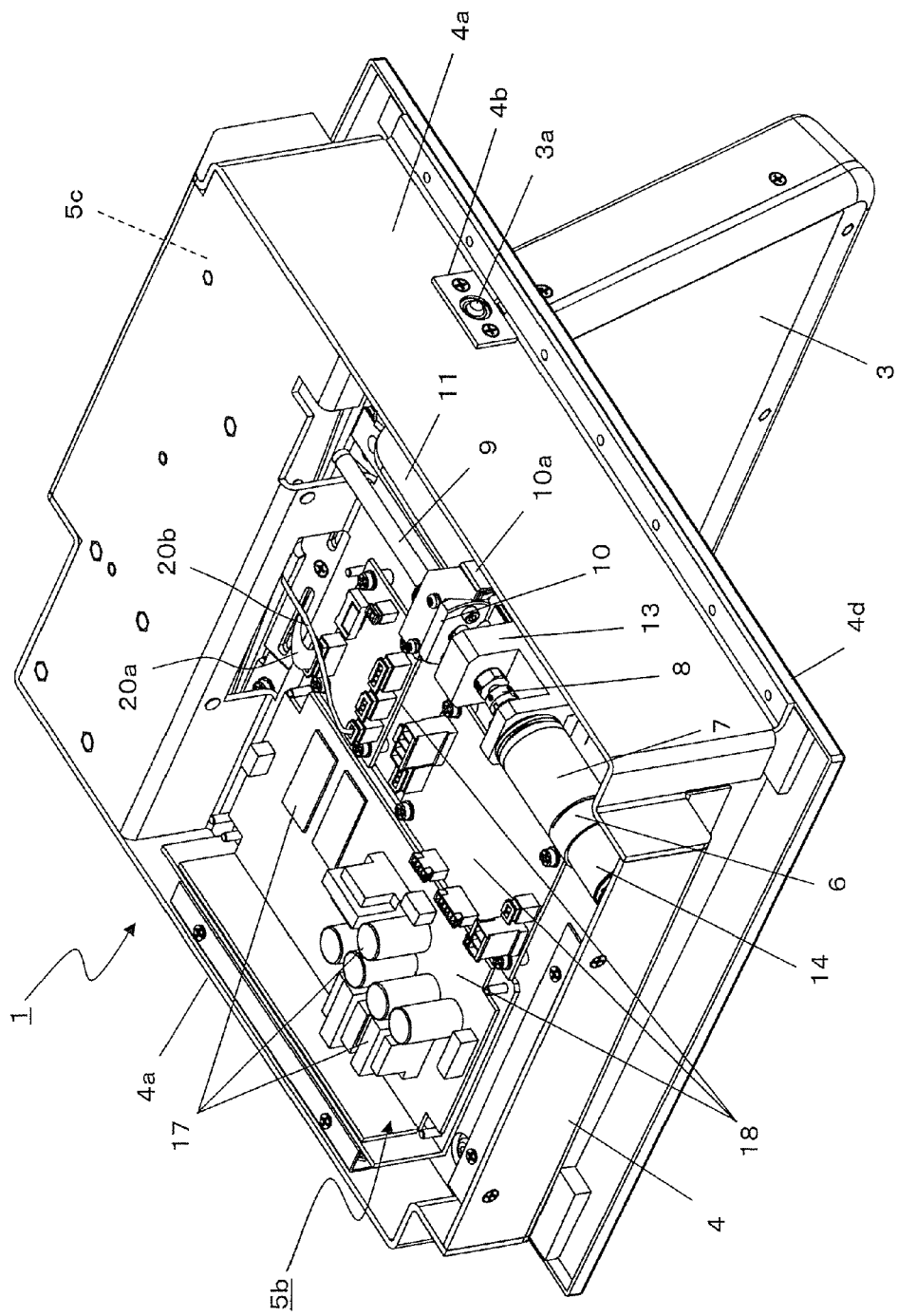
FIG. 5 is a perspective view that shows the appearance of the opened state of the monitor at the display state.

In the embodiment shown in FIGS. 1 to 5, the pivoting display device 1 is fixed to the PSU rail (not shown in figures) under the baggage rack/compartment in the ceiling area of the cabin of the aircraft. It is configured to enable a monitor 3 with a LCD unit to pivot open to the display position. The monitor 3 is supported by a bearing portion 4b that is attached and integrated into a chassis plate 4a of a chassis 4 that compose the entire device thereby enabling it to pivot around a shaft 3a. The chassis 4 serves also as a housing that composes the entire device. The said chassis comprises a stowing portion 5a, and also a stowing portion 5b which on its upper surface stows a motor 6, a gear transmission mechanism and circuit parts etc. for swinging the monitor 3. Here, in FIGS. 1 to 4, the chassis plate 4a covering the side at hand of the chassis 4 is omitted and is shown by a dotted line. FIG. 5 shows the appearance of the chassis plate 4a on the side at hand. FIGS. 1 to 5 show only one side of the chassis plate along with the bearing portion 4b that supports the shaft 3a of the monitor 3 but the other side of the chassis plate 4a is provided with another bearing facing 4b thereby enabling the stable swinging of the monitor. The pivoting display device is also configured to be fixed under the baggage rack/compartment 2 in the ceiling area of the cabin by attaching a part of the chassis 4 (not shown in figures) to the said PSU rail.

Figure 1:
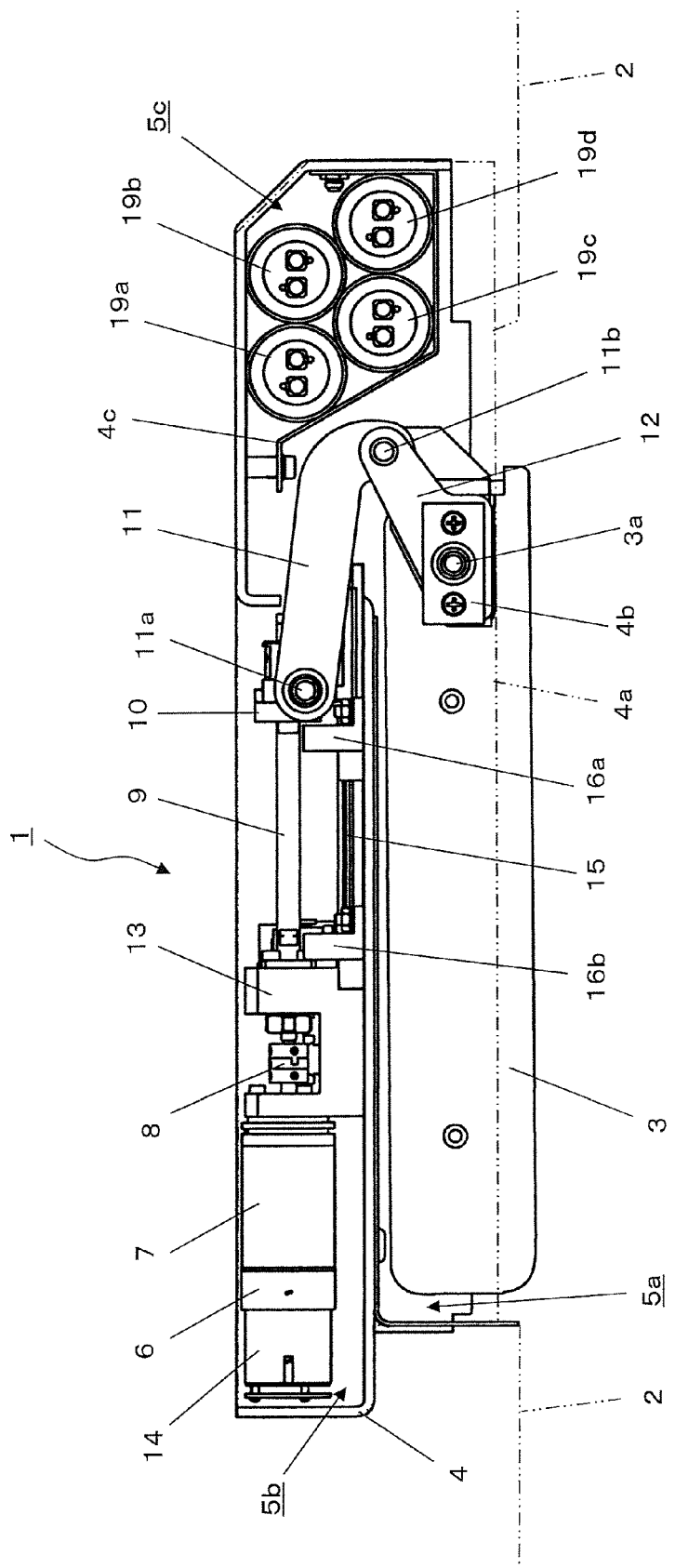
FIG. 1 is a side view of the embodiment of the present invention that is a pivoting display device for aircraft that shows the stowed state of the monitor. Some part of the chassis plate portion at hand is omitted.
Figure 2:
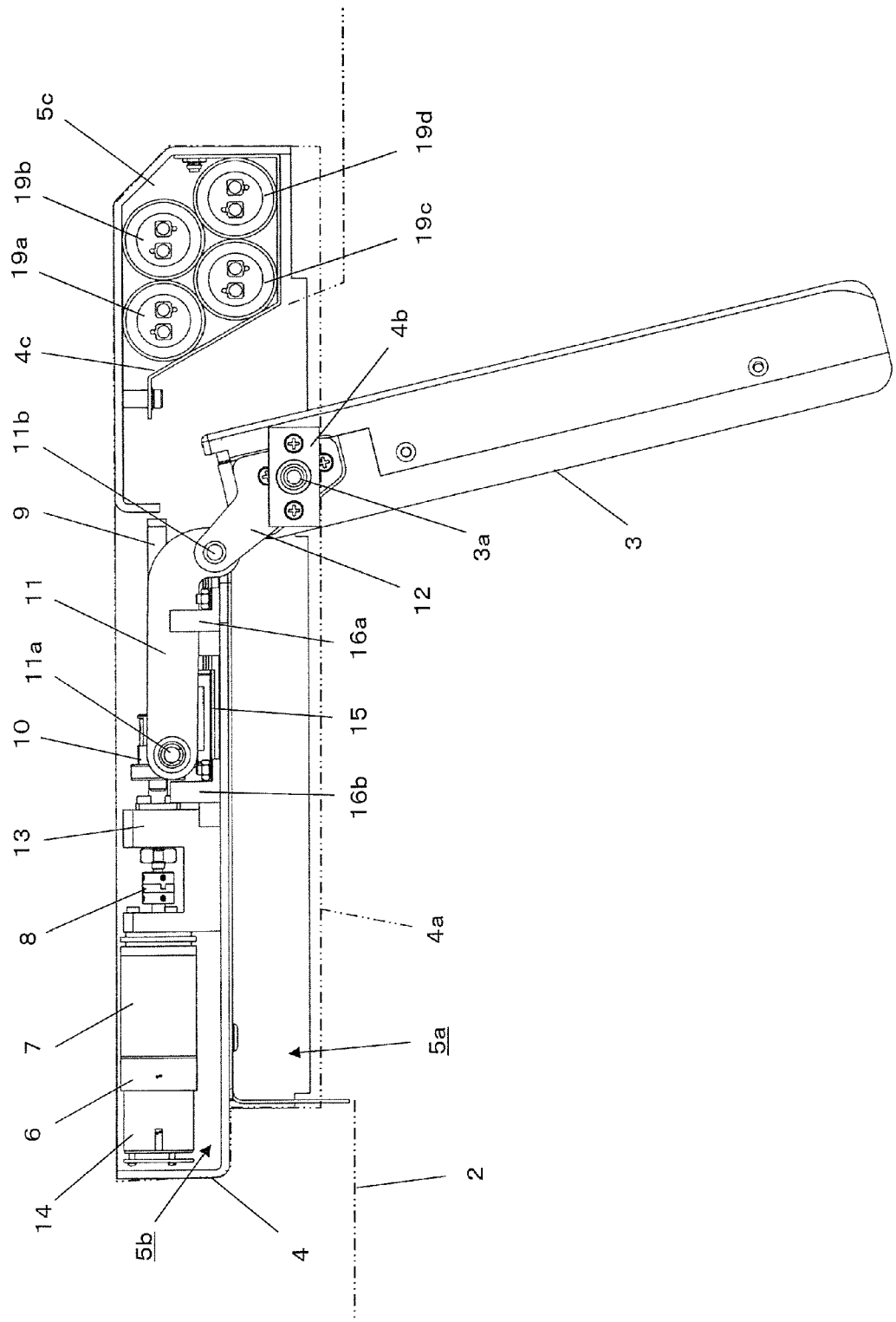
FIG. 2 is a side view that shows the open state of the monitor. The said part of the chassis plate portion at hand is omitted.
Figure 3:
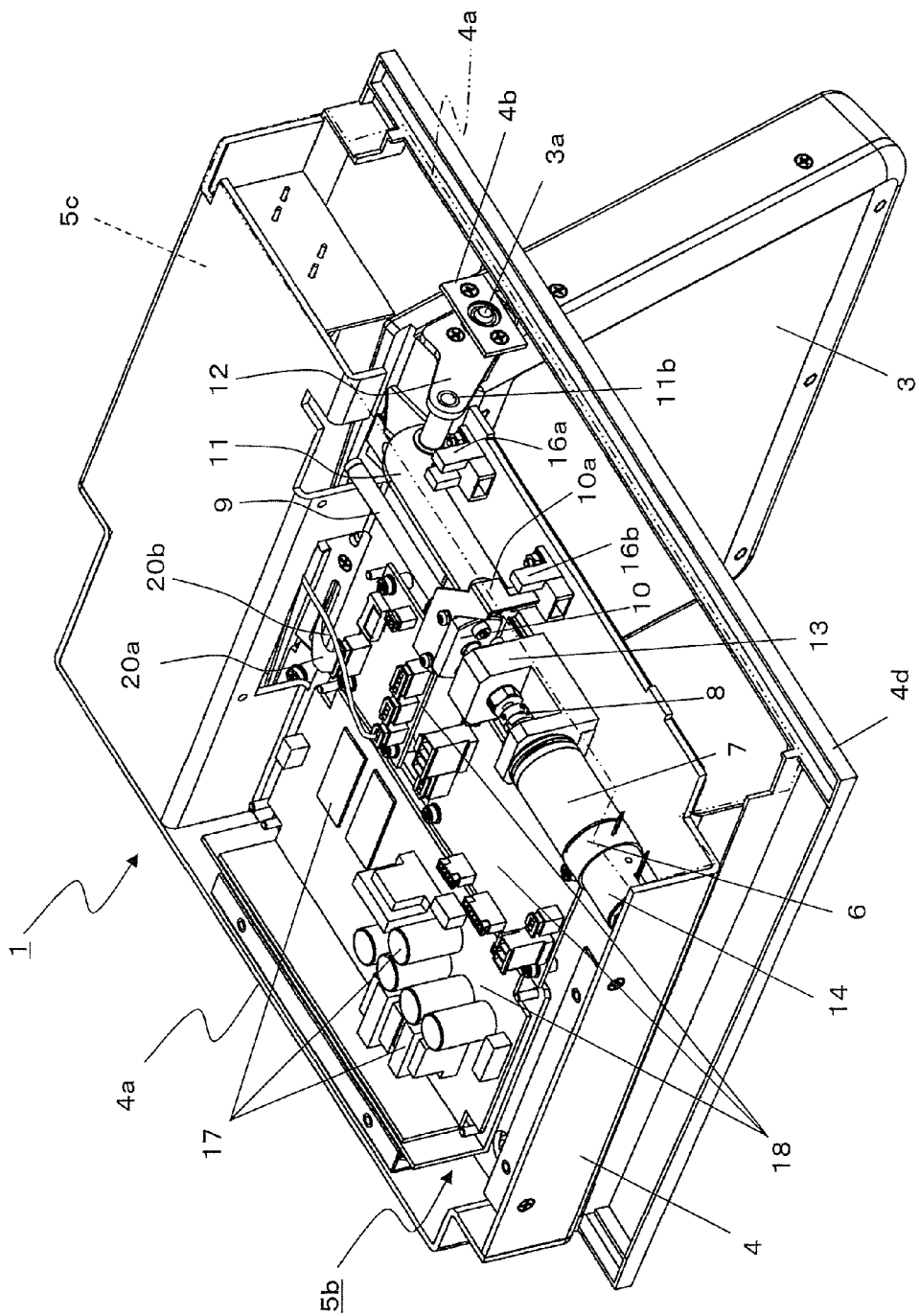
FIG. 3 is a perspective view that shows the opened state of the monitor at the display position. The said part of the chassis plate portion at hand is omitted.
Figure 4:
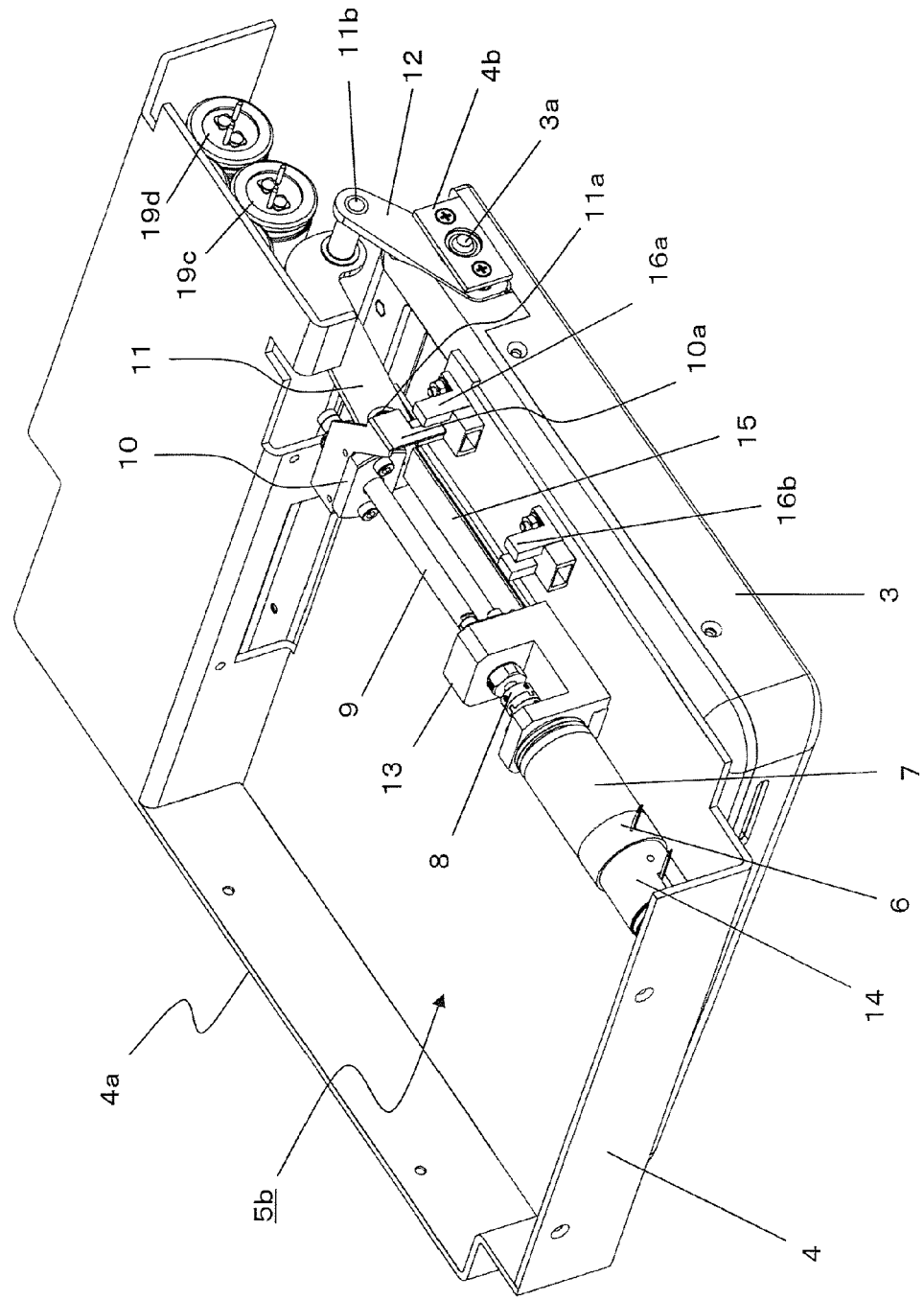
FIG. 4 is a perspective view that shows the stowed state of the monitor. Some part of the chassis plate portion shown in FIG. 4 is further omitted.

The pivoting display device 1, by swinging around shaft 3a as shown in the side views of FIGS. 1 and 2, can be pivoted from the stowed state in the stowing location 5a to the opened state at the display position where passengers can watch and listen to its programs.

The pivoting device of the monitor 3 is configured to convey the rotating force of the motor 6 to monitor 3 via the rotation transmission mechanism and the link mechanism. It specifically include the reduction gear 7 at the output side of the motor 6, a ball screw shaft 9 linked via a coupling 8 provided at the output side of the reduction gear 7, a moving piece 10 that moves with the ball-nut fitted to the ball screw shaft 9, a link 11 of which its one side is linked to the moving piece 10 and an arm portion 12 of the monitor 3 where the other side of link 11 is linked to. The output shaft of the reduction gear 7 and the output shaft of the coupling 8 are supported by a bearing 13. The ball screw shaft 9 is supported by the bearing 13 and by the ball-nut portion of the moving piece 10. The moving piece 10 and the link 11 are linked by shaft 11a and the link 11 and the arm portion 12 of the monitor 3 are linked by shaft 11b. Each of them is linked so as to allow them to rotate freely. Here, the transmission of the rotation is done without any interference since the coupling 8 absorbs the displacement between the output shaft of the reduction gear 7 and the center of the ball screw shaft 9. The moving piece 10 can move linearly along the axis line of the ball screw shaft 9 by the rotation of the ball screw shaft 9. It is configured to reduce the load on the motor 6 using balls fitted in between the ball-nut and the ball screw shaft 9.

By this configuration, the rotation force of the motor 6 is conveyed to the ball screw shaft 9 via the reduction gear 7 arranged along the coaxial direction of the shaft, then to the coupling 8, and the ball screw shaft 9 moves the moving piece 10 along its axis line by rotating itself. This linear movement of the moving piece 10 also moves one of the link shaft 11a of the link 11 along the axis line, said linear movement moving the other link shaft (11b) of the link 11. Although the arm portion 12 of the monitor 3 linked to the link shaft 11b moves in tandem with the said linear movement of the shaft, the link shaft that is linked to the said arm portion 12 makes an arc movement around the swing shaft 3a of the monitor 3. The swinging and the said arc movement of the arm portion 12 swings the monitor 3 that is integrated with the arm portion 12 around the shaft 3a. Therefore, the rotation force driven by the motor 6 is once transformed into a linear movement, and then conveyed to the monitors 3 as a swinging force which enables the monitor to pivot open and close around the shaft 3a. That is, the rotation force of the motor 6 is conveyed as the swinging force to pivot the monitor 3 open and close thereby forming a monitor pivoting device.

The pivoting device of the monitor 3 is also provided with an electromagnetic brake 14 to hold the monitor firmly in each of the opened and closed state of the monitor 3 which are the stowed state in the stowing portion and the opened state at the display position. This is done by activating the brake against the motor so that the load such as its own weight will not be conveyed to the rotor via the transmission mechanism thus rotating the rotor after the motor 6 had driven the monitor to each position. Therefore, the electromagnetic brake 14 is designed to stay activated in the stowed state and also in the opened state of the monitor 6, but is deactivated when the motor 6 needs to rotate thus reducing the driving load of the motor 6.

The moving piece 10 moved by the ball screw shaft 9 is fitted into a straight guide rail 15 provided at the bottom surface of the stowing portion 5b of the chassis 4 so as to slide in the linear motion along the guide rail 15. Moving piece 10 is provided with a sensor plate 10a and the position of the moving piece 10 can be detected by the position sensors 16a and 16b provided at the stowing portion 5b of the chassis 4. Here, position sensors 16a and 16b that are placed to face the sensor plate 10a comprise of photo sensors and are capable of detecting the sensor plate 10a when it comes to each position. The position detection by these position sensors 16a and 16b is for detecting each of the stop position of the monitor 3 in the stowed state and in the opened state.

The sets of electrical parts 17 forming the power unit of the electric circuit and the control circuit etc. described below are mounted on the PC board 18 inside the stowing portion 5b of the chassis 4 along with the aforementioned pivoting mechanism. The stowing portion 5c partitioned by the plate 4c is also provided with several capacitors 19a-19d that supply power in case of a power failure. Each circuit laid out on the PC board 18 is connected to the monitor 3 via a wiring 20a connected to the connector mounted on the PC board 18, or to capacitors 19a-19d via a wiring 20b. Although not shown in FIGS. 1 to 5, it is also provided with an input connector to supply the power from the power source of the aircraft into the present invention, that is, a pivoting display device. It is also provided with wirings etc. that are necessary for the operation of the entire device. In addition, 4d in these figures is an ornamental frame attached to the chassis 4 and is intended to improve the appearance of the penumbra of the pivoting display device 1 being attached under the baggage rack/compartment in the ceiling area of the cabin.

The circuit diagram shown in the FIG. 6 will be described next. In this description reference is made to typical voltages and frequencies presently used in aircraft. It will be recognized that in some situations, these voltages and frequencies may change. In such situations, the voltages and frequencies hereinafter mentioned should be adjusted appropriately.

This circuit diagram covers the power unit, the power supply to the monitor 3, the driving circuit that opens and closes the monitor 3 and the controller for its power supply and operation, and does not cover the circuit of the monitor 3.

The AC voltage from the power source of the aircraft, typically of AC115V/400 Hz, is normally supplied to the input connector portion and is input to the normal power circuit 54 of the power block 53 via the input voltage detection circuit 52. In this power circuit 54, the AC voltage is first transformed into the DC voltage by the first rectifier 55, then transformed into a high frequency pulse train by a switching process using the next switching circuit 56, then stepped up using the next transformer 57 and thereafter, further transformed, typically to DC220V, using the second rectifier 58 and supplied to the next current and voltage regulator circuit 59 via the smoothing capacitor C4. This current and voltage regulator circuit 59 outputs the necessary DC voltage. Video monitor rest circuits typically operate at 12 V and so this is the normal output from regulator circuit 59. However, other outputs in the range 3.3V-20 V may be used in some cases. This output is effected using a voltage regulator 59a that has a function of transforming the stepped up voltage down to the output voltage of, say, DC12V and a current distortion correction circuit 59b that has a function of correcting the current distortion. Here, this configuration of the power unit 54 composing the switching circuit 56 and the current distortion correction circuit 59b is intended to meet the requirement of the RTCA/DO-160F standards concerning the airborne electronic device of the aircraft. That is, with the said circuit configuration, it is capable of absorbing or reducing the distortion caused to the input current of the AC power source by the electric current consumed by the circuit even if that happens.

A high voltage, typically DC220V, to provide retraction power is also supplied to retention circuit 60 after being stepped up by the transformer 57 and rectified by the second rectifier 58. This retraction power retention circuit 60 is provided with capacitors C1, C2, and C3 that correspond to aforementioned capacitors 19a, 19b and 19c, resistors R1, R2 and R3 that are connected in series to control the rush current to said capacitors C1, C2 and C3 and diodes D1, D2 and D3 that are connected parallel to resistors R1, R2 and R3 to bypass these resistors R1, R2 and R3 when capacitors discharge the electricity. Capacitors C1, C2, and C3 are connected parallel, and each of them are charged to store the power. Here, it is capable of efficiently storing a high power into small size capacitors by charging capacitors C1, C2, and C3 of the retraction power retention circuit 60 with the high voltage (such as DC220V). The retraction power retention circuit 60 is charged while the source voltage is supplied to the input connector portion 51, and discharges the power to the current and voltage regulator circuit 59 via the smoothing capacitor C4 when the power supply to the input connector portion 51 stopped. The retraction power retention circuit 60 is capable of discharging the electricity as long as it can maintain the prescribed output voltage, typically of DC12V, of the current and voltage regulator circuit 59. It restarts charging when the source voltage begins to be supplied to the input connector portion 51.

Figure 6:
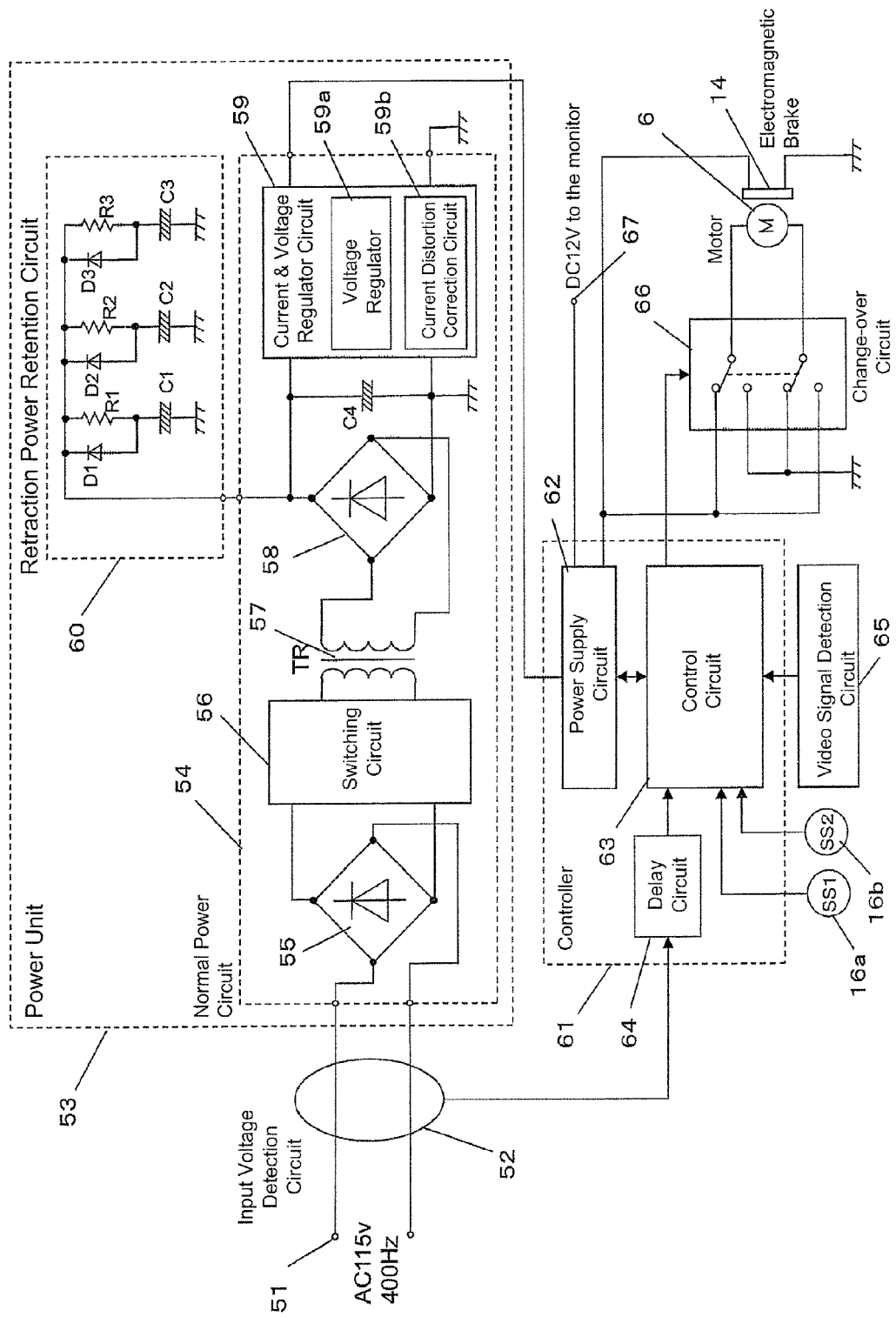
FIG. 6 is a circuit diagram that shows the said embodiment.

In FIG. 6 controller 61 comprises power supply circuit supplied with the voltage of DC12V from the output side of the current and voltage regulator circuit of the aforementioned power supply circuit 54, a control circuit 63 that controls the power supplied from a power supply circuit 62 into each of the controlled portions and a delay circuit 64 that counts the prescribed amount of time (for example, 250 mSec) when the aforementioned input voltage detection circuit 52 detects no source voltage. Power interruptions of up to 200 mSec may occur for example when switching power sources from a ground connection to power from an auxiliary power unit or power generated by the engines and so prescribed periods different from 250 mSec may be set if desired. The control circuit 63 is also capable of detecting when no source voltage is available by the input voltage detection circuit 52 via the delay circuit 64, is capable of detecting the stowed state and the opened state of the monitor 3 by position sensors 16a and 16b, and is capable of detecting that the monitor 3 is turned on when detecting the video signal using its video signal detection circuit 65. The control circuit 63 controls the pivoting of the monitor 3 by controlling the motor 6 and the electromagnetic brake 14 based on these detected result. The power supply circuit 62 controlled by the control circuit 63 supplies the required voltage (such as DC12V) to the motor 6, the electromagnetic brake 14 and also, via the output connector 67, to the monitor 3. Here, the power is supplied to the motor 6 via a change-over circuit 66 for changing over the forward and the reverse rotation of the motor. The change-over circuit 66 is provided with a pair of change-over switches that change over the polarity of the DC power source. The control circuit 63 controls this changeover. The power supply circuit 62 is constantly supplying the source voltage to the control circuit 63. Here, the motor 6 and the electromagnetic brake 14 are connected parallel to a power supply connector of the power supply circuit 62 so the power is supplied simultaneously. Therefore, the electromagnetic brake 14, while in a motor driven operation, is also supplied with and deactivated by the power supplied from the power source along with the motor 6 so as not to interfere with the rotation of the motor 6 when it is running.

Additionally, another way is to deactivate the electromagnetic brake 14 before the motor 6 starts running and to reactivate it after the motor 6 stops running by independently supplying the power to the motor 6 and to the electromagnetic brake 14. Although the power failure detection by the control circuit 63 is explained above to be delayed by the delay circuit 64 for a prescribed amount of time, another way is to input the detection result of the power failure into the control circuit 63 directly without supplying via the delay circuit 64 using instead a delaying function (a delay circuit or a counting function) inside the control circuit 63.

Figure 7:
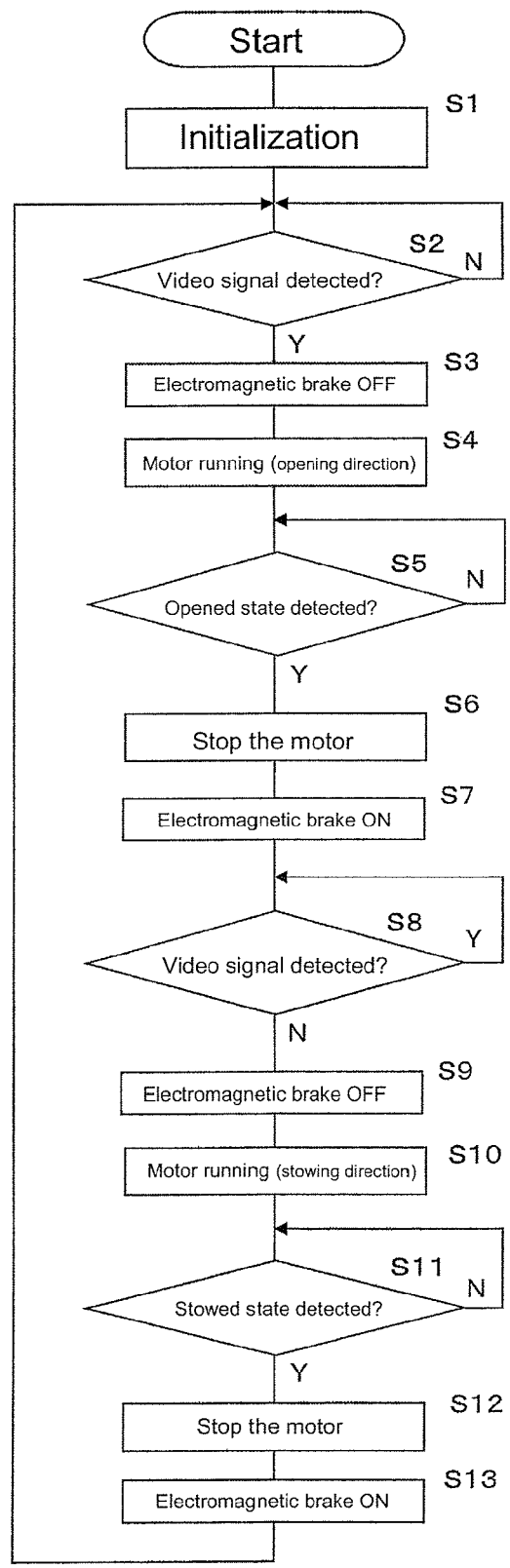
FIG. 7 is a flowchart of the control processing of the said embodiment while in its normal operation.
Figure 8:
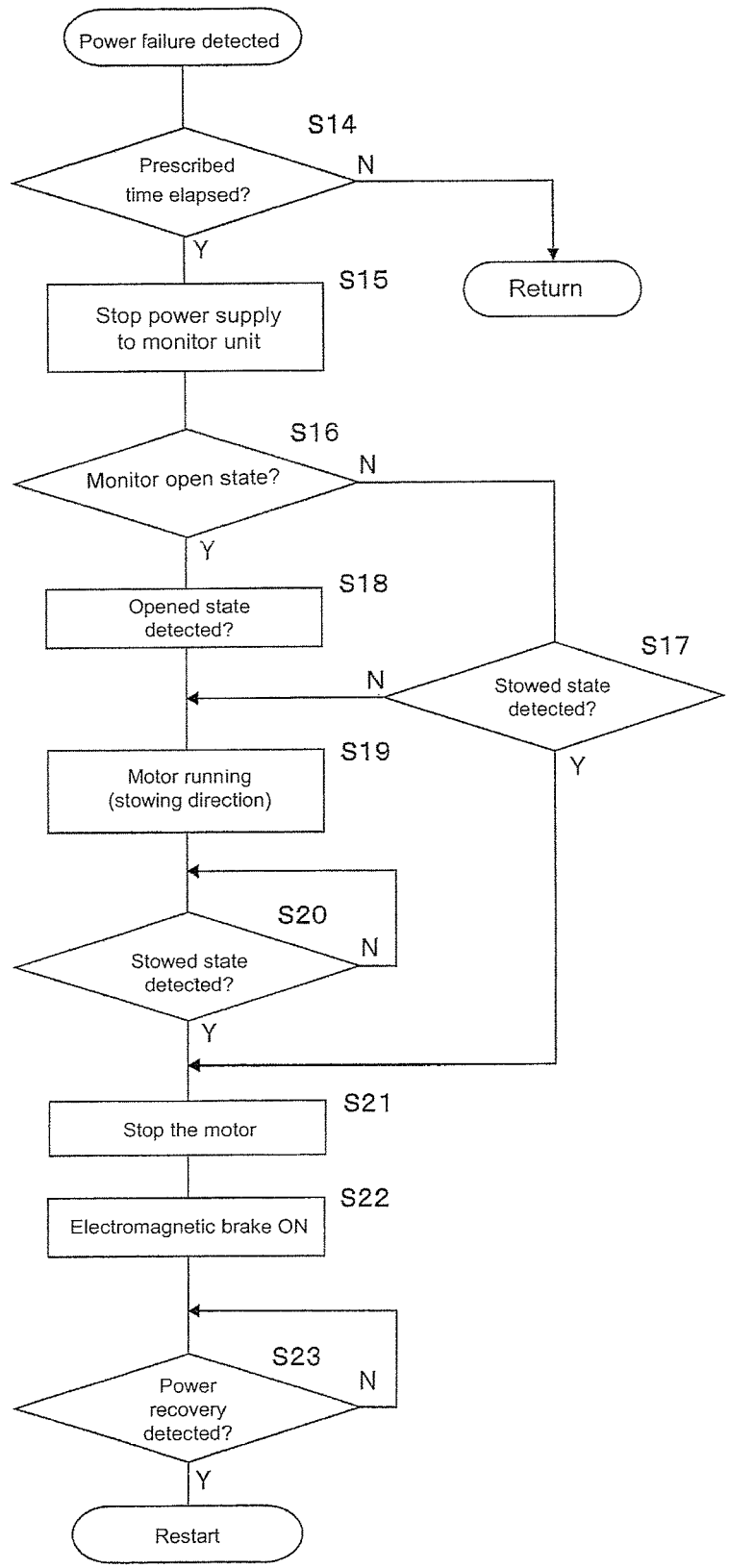
FIG. 8 is a flowchart of an interrupt control processing of the said embodiment when a power failure is detected.

The flow of the control processing by the controller 61 will be described next based on FIG. 7 that shows the flowchart of the normal operation and FIG. 8 showing the flowchart of the interrupt processing when no source voltage can be detected (power failure).

In the normal operation in FIG. 7, after initialized in step S1, the monitor 3 starts opening and heading for its display position so as to start showing the program when the video signal detection circuit 65 detects the video signal in step S2. First, the electromagnetic brake 14 is deactivated in step S3 and the motor 6 starts running in step S4 in the direction of swinging the monitor 3 open. The positions sensor 16a, at that time, has already detected the stowed state of the monitor 3 by sensing the sensor plate 10a on its side. With the change-over circuit 66 changed over to control the drive of the motor in the forward direction, the motor 6 in step S4 continues to drive the monitor 3 until it reaches the display position and the position sensor 16b detects that state in step S5. The motor 6 stops running in step S6 when the opened state of the monitor is detected. Then the electromagnetic brake 14 is activated and the opened state of the monitor 3 is maintained in step S7. The opened state of the monitor 3 is maintained until the video signal ceases to be detected in step S8. When the video signal ceases to be detected in step S8, it is decided that the monitor 3 has finished showing the program, so the electromagnetic brake 14 is deactivated in step S9 and the motor 6 starts swinging in the direction of stowing (reverse direction) to stow the monitor 3 in step S10. The changeover of the direction then is done by the change-over circuit 66 controlled by the control circuit 63. The rotation of the motor 6 in the direction of stowing the monitor 3 is maintained until the monitor 3 reaches its stowage position and the position sensor 16a detects this state in step 11. The controller proceeds to step S12 and stops the motor 6 when the stowage position is detected. The electromagnetic brake 14 is activated in step S13 to maintain the stowed state of the monitor 3 then going back to step S2 to standby until the video signal is detected again.

Then, the flow of the control operation of the interrupt processing when the power source of the aircraft fails for some reason and when this failure is detected, will be described based on FIG. 8.

In step S14, when a power failure is detected by the input voltage detection circuit 52, the delay function of the delay circuit 64 or the control circuit 63 checks whether a certain amount of time (for example, 250 mSec) has elapsed and keeps on returning until this certain amount of time elapses. In other words, in a momentary power failure when the power is restored shortly and before a certain amount of time elapses, the device maintains its control according to its normal processing procedure without carrying out the interrupt processing that begins from step S15. The operation of the display device itself is not affected by the momentary power failure since the power supply during the momentary power failure is done by the power stored in capacitors C1, C2 and C3 of the retraction power retention circuit 60. When a certain amount of elapse time is detected in step S14, the controller decides that it is in a state of power failure and proceeds to Step S15 and takes over the control to stop the power supply to the output terminal 67. Then the power supply to the monitor unit is stopped. And, the controller decides whether the monitor 3 is in its opened state or not in step S16, and decides whether it is in a stowed state or not if not in its opened state in step S17. Each state is decided by the position detected by position sensors 16a and 16b. If the opened state of the monitor 3 is detected in step S16 by the position sensor 16b, the monitor 3 is controlled to swing in the stowing direction in which case it is driven by the power stored in capacitors C1, C2 and C3 of the retraction power retention circuit 60. In that case, the controller first deactivates the electromagnetic brake 14 in step S18, and then, in step S19, reverse rotates the motor 6 and swings the monitor 3 to its stowing direction by controlling the change-over circuit 66 to reverse its polarity. This reverse rotation of the motor 6 is maintained until the stowed state of the monitor 3 is detected by the position sensor 16a in step S20. When the stowed state is detected in step S20, the controller stops the motor 6 in step S21 and also activates the electromagnetic brake 14 in next step S22 to hold the stowed state of the monitor 3. If the stowed state is not detected in step S17 above, the controller decides that the monitor 3 is being driven open or close, thus proceeding to step S19. Here, the operation of the monitor 3 is maintained if the pivoting movement is in the stowing direction, but the controller reverse rotates the motor 6 to swing the monitor 3 in its stowing direction by controlling the change-over circuit 66 in step S19 to reverse its polarity even if the pivoting movement of the monitor 3 is in its opening direction. In addition, if the stowed state is detected in step S17, the controller proceeds to step S21 taking the case where the monitor has reached its stowed state immediately before into consideration. Then, following the state in step S22 where the stowed state of the monitor 3 is complete, it maintains this processing until it detects the power recovery using the input voltage detection circuit 52, and then ends the interrupt processing and returns to the start when the power recovery is detected in step S23.

As described above, the embodiment of the pivoting display device for use in aircraft of the present invention is configured so that the monitor 3 capable of having a stowed state and an opened state can be swung using a pivoting device of the monitor 3 that comprise a forward/reverse rotatable driving motor 6 and a transmission mechanism that conveys the motor's output. It is also provided with an electromagnetic brake 14 that is activated at each position of monitor 3 in its stowed state and its opened state and that maintains these states, a power unit 53 that supplies the power to the motor 6 and the electromagnetic brake 14, and a controller 61 that controls the pivoting movement of the monitor 3. The power unit 53 is a power circuit 54 that outputs the prescribed DC voltage, comprising a rectifier circuit 55 that transforms an input AC voltage to a DC voltage, a step-up circuit 57 that steps the transformed DC voltage up and a voltage regulator 59a that adjusts the transformed voltage to provide the required DC voltage. The said power unit is further provided with a retraction power retention circuit 60 that stores the said stepped up DC current in capacitors C1, C2 and C3 while the source voltage is supplied and that supply the power stored in capacitors to the voltage regulator 59a of the said power circuit when there is no source voltage available. The said controller 53, when it detects that no source voltage is available while the monitor 3 is in its opened state, is capable of deactivating the electromagnetic brake 14 and reverse rotating the motor 6 to drive the monitor 3 to its stowed state using the power stored in the retraction power retention circuit 60.

In this embodiment, the controller, when it detects the opened state of the monitor, is capable of deactivating the electromagnetic brake and reverse rotating the motor thereby driving the monitor from its opened state to its stowage position even when no power is supplied since it supplies the power stored in the retraction power retention circuit while the power is failing regardless of its control state. Capacitors can be charged efficiently because the voltage of the power supply is stepped up when charging capacitors in the retraction power retention circuit. It is also capable of efficiently outputting a high power that is being stored in the capacitor because the power output is done by adjusting it down to the required low voltage via the voltage regulator when capacitors are discharged. This also ensures its reliability by supporting the secure stowing operation of the monitor when the power failed. Furthermore, a motor and an electromagnetic brake of low energy consumption type may be used because they do not carry a load as heavy as those that stow the monitor in case of power failures using the urging force of the spring mechanism.

Therefore, the present invention is capable of driving the monitor to its stowed state using the power stored in the retraction power retention circuit of the power unit even when the power failure occurs inside the aircraft for some reason, and thus capable of securing the safety of the passengers required by the Federal Aviation Administration (FAA). It is also capable of securely driving the monitor to the stowage position in case of a power failure without aging as in mechanical type devices and that is capable of improving the reliability of its operation by reducing the load on the motor that drives the monitor open and close, and at the same time capable of efficiently charging and discharging capacitors that are used as a power unit to supply the power in case of a power failure.

The present invention providing a pivoting display device suitable for use in aircraft, configures the control by the controller as follows.

The controller determines that the power failed and runs an interrupt processing when it detects that no source voltage has been available for the prescribed amount of time and deactivates the electromagnetic brake and drives the said motor to drive the monitor to its stowed state using the power stored in the retraction power retention circuit when it detects that the said monitor is in its opened state. In a brief power interruption due to a temporary power failure, for example of less than 200 mSec, when the source voltage is restored quickly and before the said prescribed time elapses, the controller determines that no power failure has occurred and by supplying the power stored in the retraction power retention circuit of the said power unit, maintains its control according to its normal processing procedure it followed before the temporary power failure occurred without carrying out an interrupt processing. Therefore, in the present invention, it is capable of handling the power failure and the temporary power failure distinctively and maintaining a normal operation using the power stored in the retraction power retention circuit without stowing the monitor in case of a momentary power failure that does not hinder the operation of electronic devices.

In this case, the detection to decide whether the prescribed time has elapsed or not may be done either based on the output of the delay circuit that delays the detection of the power failure by the power failure detection circuit or by inputting the result of the power failure detection of the power failure detection circuit directly into the control circuit using the counting function or the delay circuit inside the control circuit.

In the present invention, the monitor pivoting device that conveys the rotating force of the motor as a swinging force to pivot the monitor open and close is configured as below.

That is, it is provided with a ball screw shaft to which the rotating force of the motor is conveyed via the reduction gear, a moving piece that includes a nut fitted into this ball screw shaft and that transforms the rotating force of the ball screw shaft into a linear moving force and a link mechanism that transforms the linear moving force of the moving piece into a rotating force of the monitor by linking its one link to the moving piece and another to the monitor. It is capable of using the ball screw shaft to once transform the rotating force of the motor into a linear movement and then conveying it to the monitor as a swinging force via a link mechanism and also of holding the stowed state and the opened state of the monitor at both moving positions of the moving piece. It is also capable of detecting the stowage position and the display position of the monitor using position sensors provided in both moving positions of the moving piece.

This configuration is simpler than that of display pivoting devices that drive the monitor open and close using a combining structure that combines an operation using a ball screw shaft and a mechanical stowing of the monitor in case of a power failure using a coil spring, such as, for instance, one disclosed in the (JP Bulletin 2009-166582). Thus, in the present invention, in contrast to the prior literature driven by the ball screw shaft, the load that drags against driving the monitor to its stowed state when the power failed is light because it deactivates the electromagnetic brake that has been active in the opened state and the operation involves simply the ball screw shaft and the link mechanism.

In the pivoting display device of the present invention, the power unit that supplies the power for the operation of the monitor, the driving of the motor, the activation of the electromagnetic brake, and the controller is configured as follows.

That is, the power unit is provided with a rectifier that transforms the input AC voltage into the DC voltage, thereafter a switching circuit that transforms this DC voltage into a high frequency pulse train and a current distortion correction circuit that corrects the distortion of the current. Therefore, it rectifies and transforms the input AC voltage into a DC voltage that is further transformed into a high frequency pulse train and then stepping up this DC voltage into a high voltage using it to charge capacitors of the retraction power retention circuit. It is further capable of adjusting the said stepped up high DC voltage or the voltage discharged from the capacitor using a voltage regulator to attain a required and prescribed DC voltage and also capable of outputting the power after correcting the current distortion caused by the fluctuation of the input voltage using the current distortion correction circuit.

With the said configuration, it is capable of meeting the requirement of the RTCA/DO-160F standards concerning the airborne electronic device of the aircraft by absorbing or reducing the distortion of the input current of the AC power source caused by the electric current consumed by the circuit even if that happens and is capable of keeping control of the current distortion of the AC input as required for airborne electronic devices.

Additionally, in the present invention, the numbers of capacitors that compose the retraction power retention circuit or the voltage stepped up to charge these capacitors have no particular limit so long as they are capable of responding to the momentary power failures and are capable of storing the power to securely drive the monitor to its stowed state under the power failing conditions.

What is claimed:

1. A pivoting display device for use in moving a monitor between stowed and open positions which device comprises:
    a monitor configured to pivot around a shaft supported by bearings fixed to a frame of the stowing location;
    a monitor pivoting device including a forward/reverse rotatable motor that can drive the said monitor in a first closing direction and in a second opening direction, and a transmission mechanism that conveys a rotating force of the motor to the monitor;
    an electromagnetic brake that is configured to be activated at each position in the stowed state and the opened state of the monitor to maintain these states but deactivated when the monitor is in the process of being moved between its open and stowed positions;
    a power unit that drives the said monitor and also drives the said motor and the said electromagnetic brake;
    a controller that controls the pivoting of the said monitor about said shaft;
    the said power unit being a power circuit that outputs the prescribed DC voltage, comprising a rectifier circuit that transforms an input AC voltage to a DC voltage, a step-up circuit that steps up the transformed DC voltage, and a voltage regulator that adjusts the stepped up DC voltage;
    wherein said power unit is further provided with a retraction power retention circuit that stores the said stepped up DC current in the capacitor while the source voltage is supplied and that supplies the power stored in capacitors to the voltage regulator of the said power circuit when there is no source voltage available;
    and wherein the said controller, when under a power failure condition where no source voltage is detected and detecting that the monitor is in its opened state, deactivates the electromagnetic brake and reverse rotating the motor to drive the monitor to its stowed state using the power stored in the retraction power retention circuit.

2. The pivoting display device according to claim 1, wherein:
    the controller is configured to determine whether power has failed and to run an interrupt processing when it detects that no source voltage has been available for a prescribed amount of time, and to deactivate the electromagnetic brake to cause the motor to drive the monitor to its stowed state using the power stored in the retraction power retention circuit if it detects that the monitor is in its opened state;
    and said controller is further configured such that in a temporary power failure when source voltage is restored before the said prescribed time elapses, the said controller determines that no power failure has occurred and by supplying the power stored in the retraction power retention circuit of the said power unit, maintains its control according to its normal processing procedure it followed before the momentary power failure occurred without carrying out the interrupt processing.

3. The pivoting display device according to claim 2, wherein:
    the detection of whether the prescribed time has elapsed or not is done based on the output of the delay circuit that delays the detection of the power failure and that is used in the power failure detection circuit.

4. The pivoting display device according to claim 2, wherein:
the detection of the controller to determine whether the prescribed time has elapsed or not is done by inputting the result of the power failure detection done by the power failure detection circuit directly into the control circuit, using the counting function or the delay circuit in the control circuit.

5. The pivoting display device according to claim 1, wherein:
the monitor pivoting device that conveys the rotating force of the motor as the swinging force to open and close the monitor comprises;
a ball screw shaft to which the motor conveys its rotating force via the reduction gear;
a moving piece that includes a nut fitted into this ball screw shaft and that transforms the rotating force of the ball screw shaft into the linear moving force;
and the link mechanism that transforms the linear moving force of the moving piece into the rotating force of the monitor operates by linking its one link to the moving piece and another to the monitor;
whereby said device is capable of holding the stowed state and the opened state of the monitor at both moving positions of the moving piece by configuring so that the rotating force of the motor is once transformed into a linear movement by the ball screw shaft and then conveyed to the monitor as a swinging force via a link mechanism and to detect the stowage position and the display position of the monitor using position sensors provided in both moving positions of the moving piece.

6. The pivoting display device according to claim 1, wherein:
the power unit is provided with a rectifier that transforms the input AC voltage into the DC voltage, a switching circuit that transforms this DC voltage into a high frequency pulse train and a current distortion correction circuit that corrects the distortion of the current;
wherein said rectifier transforms the input AC voltage into a DC voltage that is further transformed into a high frequency pulse train and then stepping up this DC voltage into a high voltage using it to charge capacitors of the retraction power retention circuit; and
is further capable of adjusting the said stepped up high DC voltage or the voltage discharged from the capacitor using a voltage regulator to attain a required and prescribed DC voltage and also capable of outputting the said required and prescribed DC voltage after correcting it as current distortion caused by the fluctuation of the input voltage using the current distortion correction circuit.

7. The pivoting display device according to claim 1, when employed to move a monitor between stowed and open positions in a passenger vehicle.

8. The pivoting device according to claim 1, wherein said passenger vehicle is an aircraft.

9. The pivoting device according to claim 1, wherein said device is fixed to Passenger Service Unit (PSU) rails attached under the overhead baggage rack/compartment of an aircraft such that the attached monitors can be swung open downwards to the display position and can be stowed back after their use.

* * * * *